United States Patent
Kachenko et al.

(10) Patent No.: US 9,534,975 B2
(45) Date of Patent: Jan. 3, 2017

(54) FREEZE PROOF PROTECTION OF PRESSURE SENSORS

(71) Applicant: MEASUREMENT SPECIALTIES, INC., Hampton, VA (US)

(72) Inventors: Natasha V. Kachenko, Palo Alto, CA (US); David E. Wagner, Los Gatos, CA (US); Weijun Xie, Shenzhen (CN)

(73) Assignee: MEASUREMENT SPECIALTIES, INC., Hampton, VA (US)

( * ) Notice: Subject to any disclaimer, the term of this patent is extended or adjusted under 35 U.S.C. 154(b) by 151 days.

(21) Appl. No.: 14/468,047

(22) Filed: Aug. 25, 2014

(65) Prior Publication Data

US 2016/0054192 A1    Feb. 25, 2016

(51) Int. Cl.
   *G01L 7/00*    (2006.01)
   *G01L 19/06*   (2006.01)

(52) U.S. Cl.
   CPC .......... *G01L 19/06* (2013.01); *G01L 19/0627* (2013.01)

(58) Field of Classification Search
   None
   See application file for complete search history.

(56) References Cited

U.S. PATENT DOCUMENTS

| | | |
|---|---|---|
| 5,410,916 A | 5/1995 | Cook |
| 5,792,958 A | 8/1998 | Speldrich |
| 6,626,044 B1 | 9/2003 | Haji-Sheikh et al. |
| 6,871,546 B2 | 3/2005 | Scheurich et al. |
| 8,408,067 B2 | 4/2013 | Zorzetto et al. |
| 9,212,963 B2 * | 12/2015 | Kim .......... G01L 19/06 |
| 2003/0019298 A1 * | 1/2003 | Scheurich .......... G01L 19/0627 73/715 |
| 2003/0140703 A1 | 7/2003 | Weigl |
| 2009/0017337 A1 * | 1/2009 | Wexel .......... G01L 19/0645 429/413 |
| 2012/0042734 A1 | 2/2012 | Wade et al. |
| 2013/0340532 A1 * | 12/2013 | Wohlgemuth .......... G01L 19/06 73/716 |

(Continued)

FOREIGN PATENT DOCUMENTS

| | | | |
|---|---|---|---|
| DE | 102007060184 A1 * | 6/2008 | .......... G01L 19/0038 |
| WO | WO 9831997 A1 * | 7/1998 | .......... G01L 19/06 |
| WO | 0188497 A1 | 11/2001 | |

OTHER PUBLICATIONS

International Search Report dated Jan. 29, 2015 for related application PCT/US14/63405.

(Continued)

*Primary Examiner* — Andre Allen
(74) *Attorney, Agent, or Firm* — Howard IP Law Group

(57) ABSTRACT

A pressure sensor assembly for measuring the pressure of a first fluid. The assembly having a first housing including a pressure sensing device arranged therein. A diaphragm is arranged on a surface of the first housing and is configured to transmit a force exerted on a first side thereof to the pressure sensing device. A second housing is provided and attached to the first housing. The second housing may be arranged generally circumferentially around the diaphragm. A compressible element is provided and arranged within a compressible element space defined within the second housing. The compressible element is configured to transmit a force exerted thereon by the fluid to the first side of the diaphragm.

15 Claims, 4 Drawing Sheets

(56) References Cited

U.S. PATENT DOCUMENTS

2014/0013853 A1* 1/2014 Wohlgemuth .......... G01L 19/06
   73/716
2014/0345389 A1* 11/2014 Kim ....................... G01L 19/06
   73/700

OTHER PUBLICATIONS

Sandia National Laboratories. "Rheology, Adhesion, and Debonding of Lightly Cross-Linked Polymer Gels". Dec. 5, 2013.

* cited by examiner

FREEZE PROOF PROTECTION OF PRESSURE SENSORS

FIELD OF THE INVENTION

The present disclosure relates to sensors. More particularly, it relates to systems and methods for protecting fluid pressure sensors from damage due to freezing.

BACKGROUND OF THE INVENTION

Pressure sensors (or transducers) are used in various applications to measure the pressure of gases and liquids. Pressure sensor designs must take into consideration the possibility that the element being measured will undergo a phase change in response to a corresponding temperature change (e.g. a fluid being measured may freeze). In the case of a fluid freezing, ice may form in and around the pressure sensor, as well as in the associated plumbing interface. The volumetric expansion of these ice formations may cause large forces to be exerted both within internal portions of the sensor as well as on external portions of the sensor exposed to the fluid. These forces can be hundreds to thousands of times the rated pressure of the sensor, and thus, can lead to significant damage to the sensor.

In one particular application, urea injection systems use a mixture of urea and liquid water injected into a catalytic reactor to reduce mono-nitrogen oxide (NOx) levels in diesel and other internal combustion engine exhaust. In order to accomplish this, a storage tank of urea must be onboard, in addition to a pump, pressure sensors, plumbing and the like. Pressure sensors are required for measuring the urea injection pressure and to aid in precisely controlling the mixture of urea and exhaust gases. If urea is allowed to freeze (typically at −11 degrees C.) in the plumbing of the system, it can create significant pressures (e.g. in excess of 100,000 psi) depending on the specific system geometry, and may destroy sensitive system components including the pressure sensors themselves. To combat the freezing of urea, early systems implemented a pump down sequence for purging a system's urea lines. However, newer systems are required to be rated for multiple freeze cycles in case the purge cycle does not occur, such as in the case of a dead battery.

Alternative systems and methods for protecting pressure sensors from pressure overload and mechanical damage due to freezing conditions are desired.

SUMMARY

A pressure sensor assembly for measuring the pressure of a first fluid is provided. The assembly includes a first housing having a pressure sensing device arranged therein. A diaphragm is arranged on a surface of the first housing and is configured to transmit a force exerted on a first side thereof to the pressure sensing device. A second housing is provided and attached to the first housing. The second housing may be arranged generally circumferentially around the diaphragm. A compressible element is arranged within a compressible element space defined within the second housing. The compressible element is configured to transmit a force exerted thereon by the fluid to be measured to the first side of the diaphragm.

A freeze-proof assembly for a fluid pressure sensor is also provided. The assembly includes a housing configured to cover a sensing diaphragm of a pressure sensor. The housing defines an internal cavity including a compressible element space arranged proximate a first open end of the housing and a cavity space arranged proximate a second open end of the housing. A compressible element is arranged within the compressible element space, and the cavity space is filled with an adhesive material.

A method of manufacturing a freeze-proof pressure sensor is also provided. The method includes attaching a housing to a body of a pressure sensor in an area of a pressure sensing surface thereof. A compressible element is positioned within the housing so as to create a cavity between the pressure sensing surface of the pressure sensor and the compressible element. The cavity is filled with an adhesive material.

DETAILED DESCRIPTION

Figure 1:
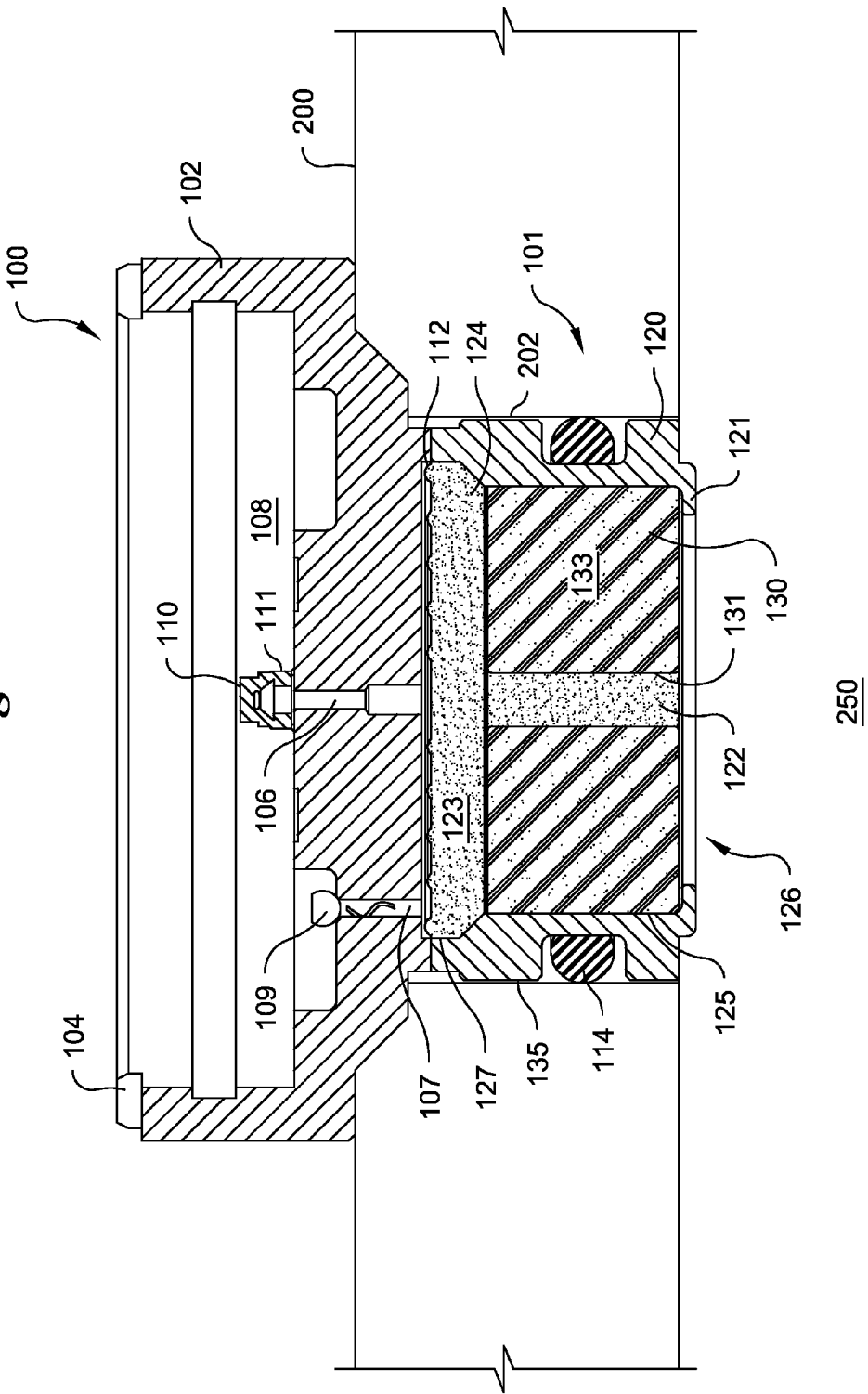
FIG. 1 is a cross-sectional view of a pressure sensor according to an embodiment of the present disclosure.

It is to be understood that the figures and descriptions of the present invention have been simplified to illustrate elements that are relevant for a clear understanding of the present invention, while eliminating, for purposes of clarity, many other elements found in typical sensing systems, such as pressure sensors. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Embodiments of the present disclosure relate to systems and methods for protecting pressure sensors against freezing fluids, as well as to pressure sensors having integrated or embedded freeze protection features. Embodiments of the present disclosure may be implemented in sprinkler systems, municipal/private water systems, municipal/private sewer systems, and water storage systems by way of non-limiting example. In one embodiment of the present disclosure, a pressure sensor assembly for measuring the pressure of a fluid is provided. The sensor assembly may comprise a sensor body or housing in which a pressure sensing element, such as a transducer, is arranged. The sensor assembly may further comprise an exterior sensing surface, such as an isolating diaphragm, exposed directly or indirectly to the fluid to be measured. The diaphragm may be configured to transmit a pressure exerted on a first side thereof (i.e. pressure from a fluid to be measured) to a second fluid arranged within the sensor housing and in communication with the pressure sensing element.

In order to protect the sensor components, including the diaphragm, from being damaged upon the freezing of the fluid to be measured, a compressible element made of an elastomeric material, such as silicone or polyurethane foam, may be fitted over the diaphragm. The composition, size, and orientation of the compressible element are selected such that the element is configured to compress, or elastically deform, under pressure exerted thereon by the fluid to be measured. In this way, the compressible element may absorb a volume change in the fluid occurring due to freezing. A gel or other generally soft, pliable adhesive, such as a silicone adhesive, may be used in conjunction with the elastomeric material to protect and/or isolate the diaphragm or other fragile surfaces of the pressure sensor from the fluid to be measured. In one embodiment, the elastomeric material and the adhesive may be arranged within a housing, and the housing attached to the sensor in an area of the sensing diaphragm.

Figure 2:
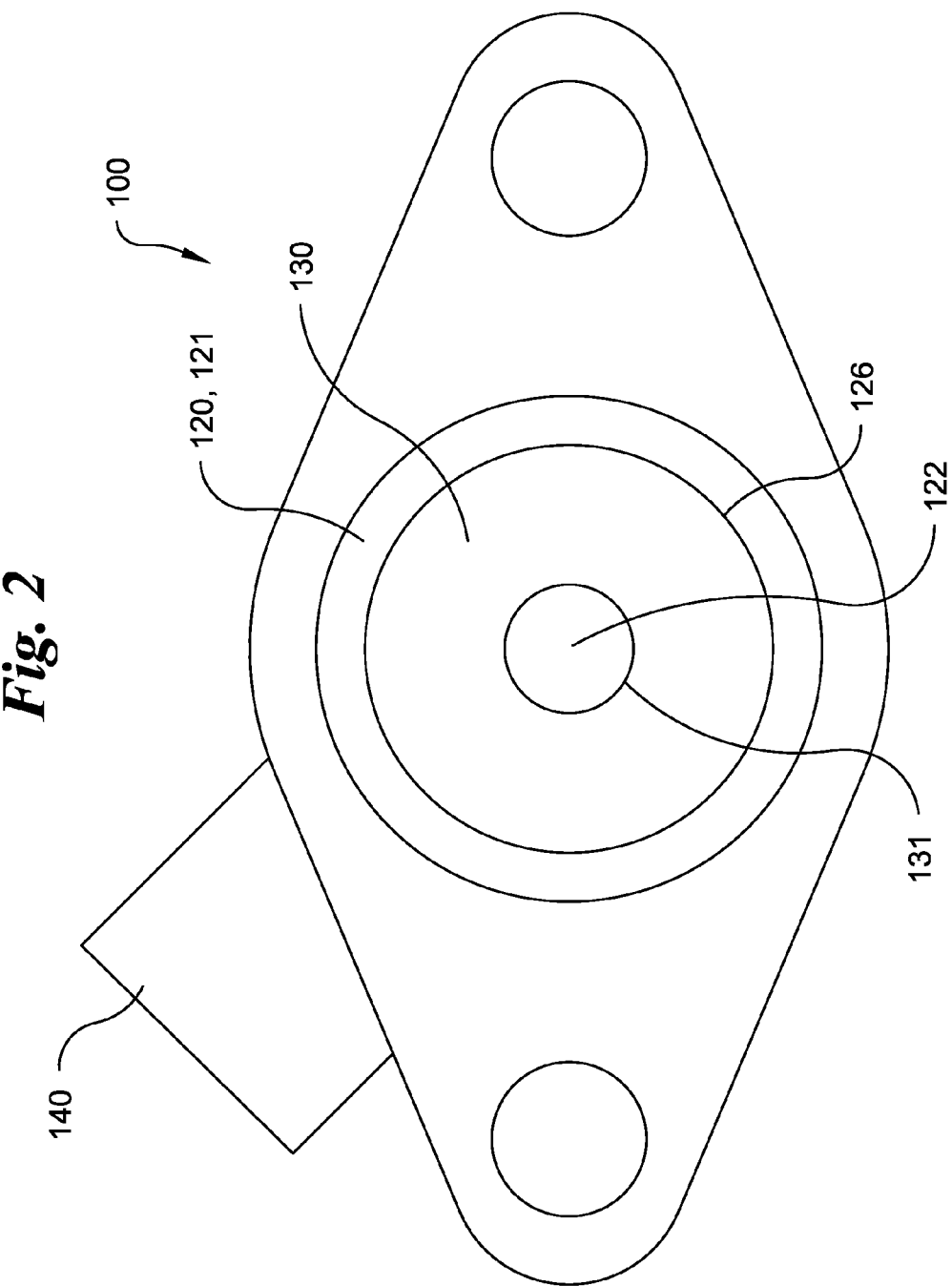
FIG. 2 is a bottom view of the pressure sensor of FIG. 1.

FIGS. 1 and 2 illustrate an exemplary pressure sensor assembly according to an embodiment of the present disclosure. Pressure sensor assembly 100 is shown as installed within an opening or bore 202 formed through an exemplary fluid reservoir or conduit 200 for measuring a pressure of a fluid 250 contained therein. Pressure sensor assembly 100 includes a sensor body or housing 102 defining a cavity space 108 therein. Cavity space 108 may be empty or fluid filled, and sealed via a cover 104. A pressure sensing die 110 is arranged within cavity space 108. As will be understood by one or ordinary skill in the art, pressure sensing die 110 may be formed from a semiconductor material such as silicon. Pressure sensing die 110 is thinned to create a cavity and a corresponding diaphragm. Resistive elements may be formed on the surface of pressure sensing die 110 that exhibit resistance proportional to the strain placed on the thinned semiconductor material forming the diaphragm. Sensing die 110 is typically mounted to a support structure 111 for isolating pressure sensing die 110 from sources of strain that are unrelated to pressure, such as thermal expansion. Sensing die 110 and support structure 111 may be bonded to a sensor housing 102, which may also be termed a header, by an adhesive.

Pressure sensing device 100 may include an isolating pressure sensing diaphragm arranged between an enclosed volume of fluid within sensor housing 102 and fluid 250 for performing pressure measurements while protecting pressure sensing die 110. For example, an opening 107 is provided through sensor housing 102 for filling a space between a top side an isolating or pressure sensing diaphragm 112 and sensor housing 102, as well as an opening 106 in communication with sensing die 110, with an isolating fluid (e.g. a silicone oil). Once filled, opening 107 may be sealed via, for example, weld 109. Diaphragm 112 may be formed from a corrosion resistant metal such as stainless steel, Hastelloy® or titanium, which may contact harsh fluids to be measured without detriment. In operation, pressure is exerted on a bottom side of diaphragm 112 by fluid 250. Diaphragm 112 is configured to deflect in response to this application of force, transmitting an equivalent force to the oil in the above-described enclosed volume, which in turn is transmitted to sensing die 110 for measuring pressure. In this way, the pressure exerted by fluid 250 is conveyed to sensing die 110 without contact between fluid 250 and sensing die 110 or other electrical components within sensor housing 102.

Pressure sensing device 100 includes a freeze protection assembly 101, including a secondary housing or plug 120 in communication with fluid 250. Plug 120 may be arranged over diaphragm 112 and sealably attached (e.g. adhered or welded) to sensor housing 102 such that it generally covers diaphragm 112. In one embodiment, plug 120 is constructed of stainless steel, Hastelloy® or titanium. While plug 120 may comprise any suitable shape, in the exemplary embodiment, plug 120 includes a generally annular wall having an interior wall 125 and an exterior wall surface 135. Plug 120 comprises a first opening 126 formed on a first end thereof exposed to fluid 250, and a second opening 127 formed on a second end thereof arranged generally over diaphragm 112. Interior wall 125 defines a generally hollow interior space including a cavity space 123 and a compressible element space 133. As illustrated, cavity space 123 may be defined generally above compressible element space 133, as oriented in FIGS. 1 and 3. Exterior wall surface 135 may further define an annular recess for accepting a sealing element 114 (e.g. a sealing o-ring) for forming a seal between bore 202 and pressure sensing device 100.

Compressible element space 133 is sized to accommodate a compressible element 130 arranged therein. As illustrated, exemplary compressible element 130 may comprise a generally cylindrical shape corresponding to the profile of compressible element space 133, and may define one or more apertures 131 formed therethrough. In the illustrated embodiment, aperture 131 is centralized and extends from a first end of compressible element 130 configured to be placed into contact with a fluid to be measured, to a second end of compressible element 130 in communication with cavity space 123. Compressible element 130 may be formed from an elastomeric material, such as a silicon or polyurethane foam, by way of non-limiting example only. Compressible element 130 should be elastically deformable such that it is configured to compress in size when a sufficient force is exerted thereon. Plug 120 may further include an annular surface or lip 121 extending radially inward with respect to interior wall 125 for retaining compressible element 130 within compressible element space 133 once installed.

Cavity space 123 and aperture 131 of compressible element 130 may be filled with a sealant or adhesive material 122,124, such as silicon gel. In addition to providing a medium for the transfer of pressure acting on compressible element 130 to diaphragm 112, material 122,124 further isolates fluid 250 from pressure sensing die 110 and diaphragm 112, protecting these sensitive components from damage and corrosion and other environmental hazards. For example, material 122,124 provides a sealing function, preventing fluid 250 from entering cavity space 123, thereby preventing damage to diaphragm 112 in the event fluid 250 beings to freeze. In other embodiments, one or both of aperture 131 and cavity space 123 may be substantially empty, such that fluid may exert pressure directly onto (or at a point in closer proximity to) diaphragm 112. In addition to providing a conduit for adhesive material 122 to be delivered into cavity space 123, the formation of aperture 131 in compressible element 130 has been shown to increase the accuracy and consistency of pressure measurements made by the sensor assembly.

During normal operation of pressure sensing device 100, pressure exerted by fluid 250 on an exposed end of compressible element 130 and material 122 via opening 126 is transmitted through compression element 130 and material 122,124 to the underside of diaphragm 112. Diaphragm 112 is configured to flex under this pressure, applying an equivalent force on the enclosed volume of oil arranged above the top side of diaphragm 112 and within opening 106 for communicating with sensing die 110. As set forth above, sensing die 110 acts in a conventional way, producing electrical signals through piezo-resistive elements formed on a surface of the diaphragm thereof. These electrical signals are representative of the force applied to the surface of sensing die 110, and may be conducted via bond wires to an exterior electrical connection 140 (FIG. 2).

Figure 3:
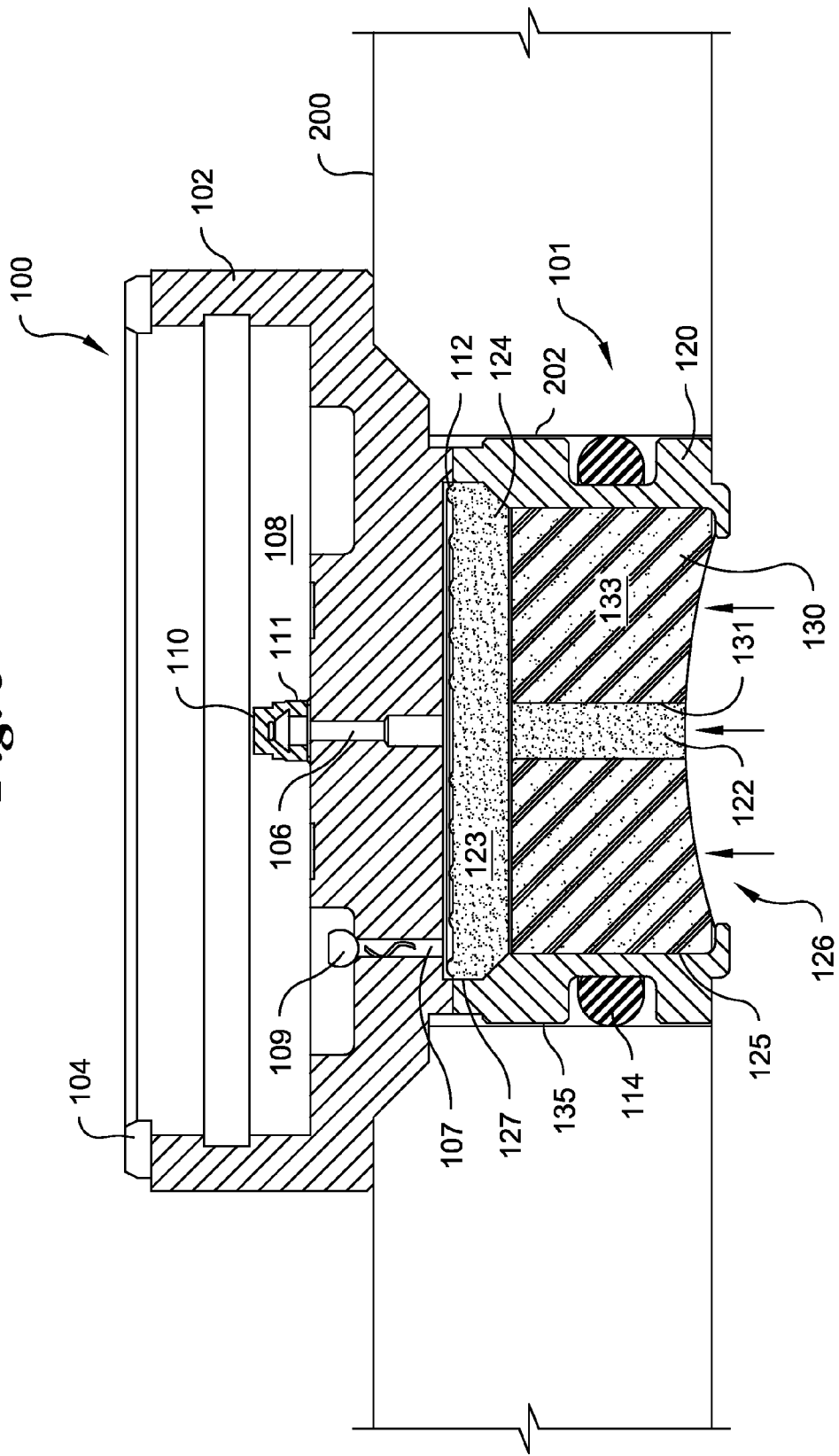
FIG. 3 is a cross-sectional view of the pressure sensor of FIG. 1 illustrating the freeze protection mechanism according to an embodiment of the present disclosure.

FIG. 3 illustrates the operation of pressure sensing device 100 when fluid 250 transitions into a frozen state. Upon freezing, expansion of fluid 250 acts to compress compressible element 130. More specifically, compressible element 130 is defined by a first volume when fluid 250 is in a liquid state at a given pressure, as illustrated in FIG. 1. As fluid 250 freezes, and its volume expands, compressible element 130 is compressed, and defined by a second, smaller volume. In this way, the compression of compressible element 130 accounts for the volume change of fluid 250 which could otherwise damage portions of pressure sensing device 100, including diaphragm 112.

Figure 4:
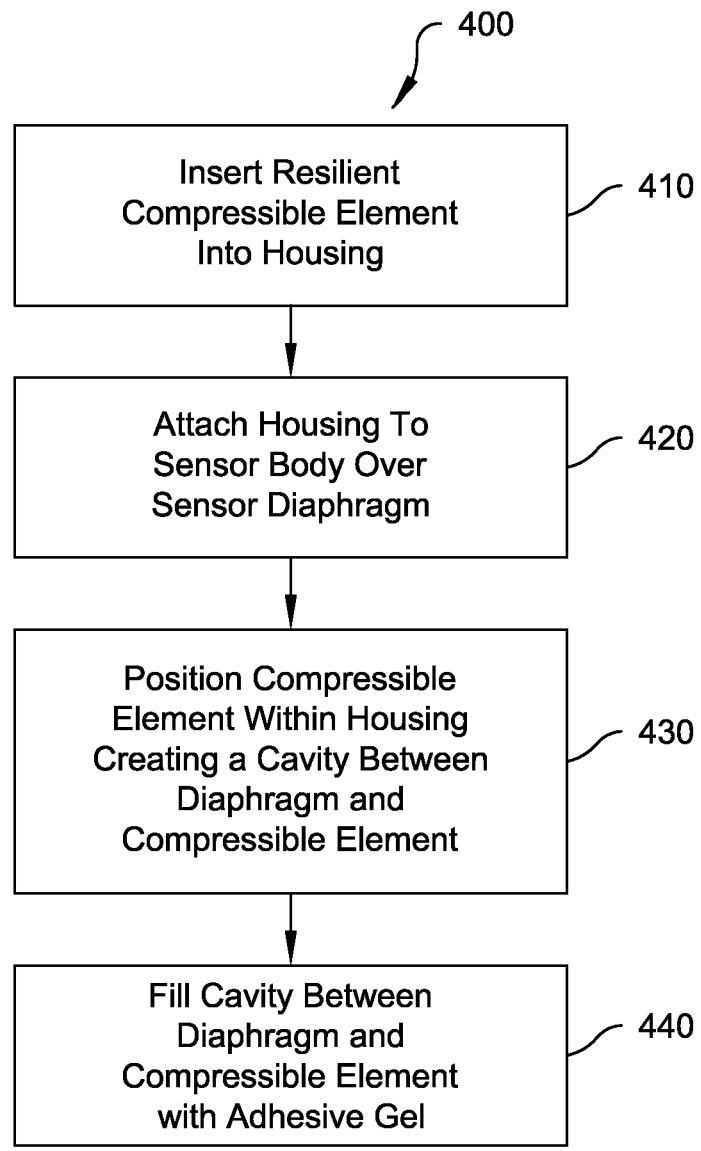
FIG. 4 is a process diagram illustrating a method of constructing a pressure sensor according to an embodiment of the present disclosure.

FIG. 4 provides an exemplary method 400 for manufacturing a sensor according to embodiments of the present disclosure. In a first step 410, a compressible element is inserted, positioned, or dispensed into a correspondingly-sized cavity of a housing, such as secondary housing or plug 120 as illustrated in FIGS. 1-3. The housing may then be attached to a pressure sensor housing or body in step 420. More specifically, the secondary housing may be fitted over a flexible diaphragm of a pressure sensor, or other sensing surface or port of a pressure sensor, and securely attached to a body of the sensor by, for example, an adhesive. In step 430, the position of the compressible element within the housing may be adjusted to ensure the creation of a cavity between the diaphragm of the sensor and the compressible element. Finally, in step 440 a sealant or gel may be used to fill the remaining volume of the cavity. In one embodiment, the compressible element comprises a through hole or aperture, and the sealant may be introduced into the cavity via the aperture. The sealant may also be used to fill the aperture, ensuring that a fluid to be measured remains isolated from the diaphragm of the sensor.

While embodiments of the present disclosure have been shown and described as applied to an exemplary pressure sensor utilizing an isolating diaphragm, it should be understood that embodiments may be utilized in conjunction with any other type of pressure sensor without departing from the scope of the present disclosure. It should also be understood that embodiments of the present disclosure may include sensor assemblies originally configured to utilize the freeze protection components described above. For example, sensor housing 102 (and diaphragm 112) may be specifically configured to attach to plug 120. Likewise, embodiments of the present disclosure may be configured to be retrofitted to existing sensors. In these embodiments, appropriately dimensioned plugs 120 and corresponding compressible elements 130 may be attached (e.g. by an adhesive) to existing sensor bodies, without the need for modification thereto.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A pressure sensor assembly for measuring the pressure of a fluid comprising:
   a first housing;
   a pressure sensing device arranged within the first housing;
   a diaphragm arranged on a surface of the first housing and configured to transmit a force exerted on a first side thereof to the pressure sensing device;
   a second housing attached to the first housing and arranged circumferentially around the diaphragm, the second housing including a first open end configured to be placed in communication with the fluid to be measured, and a second open end oriented proximate the diaphragm; and
   a compressible element arranged within a compressible element space defined within the second housing;
   wherein the compressible element is configured to transmit a force exerted thereon by the fluid to be measured to the first side of the diaphragm.

2. The sensor assembly of claim 1, wherein the second housing further defines a cavity space arranged between the compressible element space and the diaphragm.

3. The sensor assembly of claim 2, wherein the cavity space is filled with an adhesive material.

4. The sensor assembly of claim 3, wherein the adhesive material is configured to isolate the diaphragm from the fluid to be measured.

5. The sensor assembly of claim 2, wherein the compressible element defines an aperture formed therethrough, the aperture having a first end configured to be exposed to the fluid to be measured, and a second end in communication with the cavity space.

6. The sensor assembly of claim 5, wherein the aperture is filled with an adhesive material such that the fluid to be measured is prevented from entering the aperture.

7. A freeze-proof assembly for a fluid pressure sensor:
a housing configured to cover a sensing diaphragm of a pressure sensor, the housing defining an internal cavity including a compressible element space arranged proximate a first open end of the housing and a cavity space arranged proximate a second open end of the housing;
a compressible element arranged within the compressible element space, and defining an aperture formed therethrough; and
an adhesive material arranged within the cavity space.

8. The assembly of claim 7, wherein the cavity space is arranged between the compressible element and the diaphragm.

9. The assembly of claim 7, wherein the adhesive material is configured to isolate the diaphragm from a fluid being measured.

10. The assembly of claim 7, wherein a first end of the compressible element is configured to be placed in communication with a fluid to be measured.

11. The assembly of claim 7, wherein the aperture extends between a first end of the compressible element configured to be placed in communication with the fluid to be measured, and a second end in communication with the cavity space.

12. The assembly of claim 11, wherein the aperture is filled with an adhesive material such that the fluid to be measured is prevented from entering the aperture.

13. A method of manufacturing a freeze-proof pressure sensor comprising:
attaching a housing over a pressure sensing diaphragm of a pressure sensor;
inserting a compressible element into the housing;
positioning the compressible element within the housing so as to create a cavity between the pressure sensing diaphragm of the pressure sensor and the compressible element; and
filling the cavity with an adhesive material.

14. The method of claim 13, further comprising the step of forming an aperture through the compressible element.

15. The method of claim 14, further comprising the step of filling the aperture with an adhesive material.

* * * * *